May 7, 1963

A. O. PAYNE 3,088,500

AUTOMATIC CLOSING NOZZLE

Filed July 30, 1957

Inventor.
Amos O. Payne.
By Byron Hume Frourr Clement
Attys.

May 7, 1963 A. O. PAYNE 3,088,500
AUTOMATIC CLOSING NOZZLE
Filed July 30, 1957 4 Sheets-Sheet 3

Inventor.
Amos O. Payne.
By Byron Hume Brown & Clement
Attys.

United States Patent Office 3,088,500
Patented May 7, 1963

3,088,500
AUTOMATIC CLOSING NOZZLE
Amos O. Payne, 1560 Parkway, Dubuque, Iowa
Filed July 30, 1957, Ser. No. 675,241
21 Claims. (Cl. 141—208)

My invention relates to an automatic shut-off filling nozzle and has particular reference to a filling nozzle normally attached to discharge hoses from gasoline pumps and primarily used for dispensing gasoline into the tanks of automobiles, airplanes and other types of vehicles powered with internal combustion engines.

One of the objects of my invention is the provision of an automatic shut-off nozzle which will function accurately and quickly at all times independently of the flow of liquid therethrough and in which a spring loaded valve forming a part of the nozzle is manually opened and held in open position by toggle means which can be tripped and collapsed either by hydrostatic pressure or by a safety member forming a part of the mechanism thereby permitting the valve to close and shutting off the flow of liquid therethrough.

Another object of my invention is the provision of an automatic shut-off nozzle in which a spring loaded safety member is provided which must be actuated either by the operator accurately placing the nozzle into the opening in the filling tank of a vehicle, or by manually manipulating the safety member, thereby permitting the valve operating mechanism to function for the manual opening of the main control valve, but upon the safety member being disturbed during the filling operation, the safety member causes the toggle means to collapse thereby permitting the valve to close, lessening the danger of the spilling of gasoline around the filling station thereby decreasing the fire hazards.

Another and further object of my invention is the provision of an automatic shut-off nozzle in which a safety member is provided which must be intentionally manipulated to safety position to set up the valve opening mechanism and held in such a safety position when the valve is open and liquid flowing therethrough but which if accidentally disturbed by someone stumbling over the gas hose, or by either the accidental or intentional movement of the vehicle, the safety member automatically trips the valve operating mechanism thereby causing the main valve in the nozzle to close thereby shutting off the flow of liquid therethrough before any great quantity of gasoline or other liquid is spilled from the said nozzle thereby decreasing the fire hazard around filling stations.

Another and further object of my invention is the provision of an automatic shut-off filling nozzle in which the closing mechanism functions regardless of the flow of fluid therethrough, the automatic closing mechanism being tripped by hydrostatic pressure built up in a chamber in the valve body by fluid discharged in a tank rising in a tube in the discharge spout or by pressure means auxiliary to the discharge spout, and connected with the chamber in the valve which trips the valve operating mechanism thereby automatically closing the valve and stopping the flow of liquid therethrough.

Another and further object of my invention is the provision of an automatic shut-off filling nozzle having two independently and separately operating tripping means for the toggle members normally holding the main valve in open position, and in which the tripping means function to close the main valve when a tank is filled and also when the filling nozzle is accidentally displaced during the filling operation regardless of how far the filling of a tank has progressed.

Another and further object of my invention is the provision of an automatic shut-off filling nozzle in which a plurality of types of spouts can be applied thereto to fit various types and kinds of openings in the filling tanks of automobiles therefore making the pump adaptable for various kinds and types of automobiles regardless of the manufacturer of the vehicle.

Another and further object of my invention is the provision of a spout having a circular break groove therearound eccentric with respect to the said spout in that the groove is cut deeper on the top side of the nozzle than it is on the under side whereby, if the nozzle is left in the tank opening and the automobile drives away from the pump, the spout will be fractured and broken off, usually in a downward direction without damage to the mechanism or without pulling the hose loose from its connection with the pump so that gas is spilled around a filling station thereby reducing a possible fire hazard from such spilled gasoline, but is not easily broken if dropped upon a hard surface in a vertical direction with the curved side of the spout downward.

Another and further object of my invention is the provision of a discharge nozzle which will automatically shut-off when a receiving tank is filled, but which can be manually operated so as to dispense a measured quantity of fluid into a tank in which case the main valve can be opened and closed manually without the use of the automatic closing mechanism.

These and other objects of my invention will be better and more fully understood with reference to the accompanying drawings and in which—

Referring now specifically to the drawings and in which like reference characters refer to like parts throughout a nozzle body 10 is shown with a dividing wall 11 therein having a main valve 12 mounted in an opening in the dividing wall 11 with a liquid receiving chamber 13 being formed on one side of the valve 12 and a liquid discharge chamber 14 on the opposite side of the valve 12 in the nozzle body 10. The nozzle body 10 has a chamber 15 formed therein and has a discharge spout 16 secured thereto which is fitted into a socket 17 formed in the nozzle body 10 with a break groove 18 being provided in the spout so the spout 16 will break very easily if the spout is retained in the tank opening and the driver of the vehicle moves the vehicle away from the dispensing pump. The break groove is shallower at the bottom of the spout than it is at the top so the spout will break in a downward direction if subjected to sufficient strain but will withstand breakage if dropped upon a hard surface with the underside first striking such surface. A stem 19 is provided which has a bore 20 longitudinally therethrough in communication with a bore 21 in the nozzle body 10 which, in turn, communicates with a chamber 22 formed in the nozzle body 10 and in which the stem 19 is seated. A tube 23 is mounted within the spout 16, and is fitted with a press fit over the stem 19 at its upper end and is turned at right angles at its opposite end and secured to the wall of the spout 16 so an inlet opening 24 is provided at the side of the spout 16 adjacent the discharge end of the spout 16. When the tip end of the spout 16 is broken at the break groove 18 because of the vehicle being moved while the nozzle is still inserted into the tank or for some other reason the end of the spout 16 beyond the break groove 18 will be broken off and may remain in the vehicle tank or may drop to the ground. When such an occurrence takes place the tube 23 and the stem 19 are detached from the nozzle body 10 and remain with the broken end of the spout 16. The tube 23 is secured to the spout 16 at its outer end by being welded thereto, and the stem 19 has a sliding press fit into the chamber 22 formed in the nozzle body 10 with a sealing ring 19a fitted in a circumferential groove formed in the stem 19 adjacent its inner end. When such a break occurs the tube 23 and stem 19 remain attached to the broken end of the spout 16 and the connection between the gas pump and the vehicle is broken and a minor amount of damage results. The nozzle can easily be repaired by taking out the broken off upper end of the spout 16 and placing a new spout, such as 16, into position in the nozzle body along with a new tube 23 and stem 19 inserted into the recess 22 in the nozzle body. The tube 23 usually has a soldered connection to the stem 19 so a pulling force exerted on the tube 23 pulls the stem 19 free of the nozzle body 10. A small tube 25 is mounted in the stem 19 in communication with the passage 20 therein and extends axially into the upper end of the tube 23 for a short distance, and provides means whereby air which is trapped in the tube 23 by the rising fluid in the tank passing the end of the spout 16 and the opening 24, is compressed in the chamber 15 and creates a hydrostatic head in the chamber 15, thereby actuating the tripping mechanism to close the main valve 12 as will be described more fully hereinafter. The tube 25 terminates short of a point above which the fluid may rise and is spaced from the wall of the tube 23 forming a space within which gasoline adhering to the inner surface of the tube 23 may drain when the nozzle is removed from the tank and suspended from the usual hook on the side of the pump with the open end of the nozzle upward, thereby preventing the flow of such gasoline into the chamber 15, which would interfere with the operation of the device.

Figures 1, 5, 7, 8:
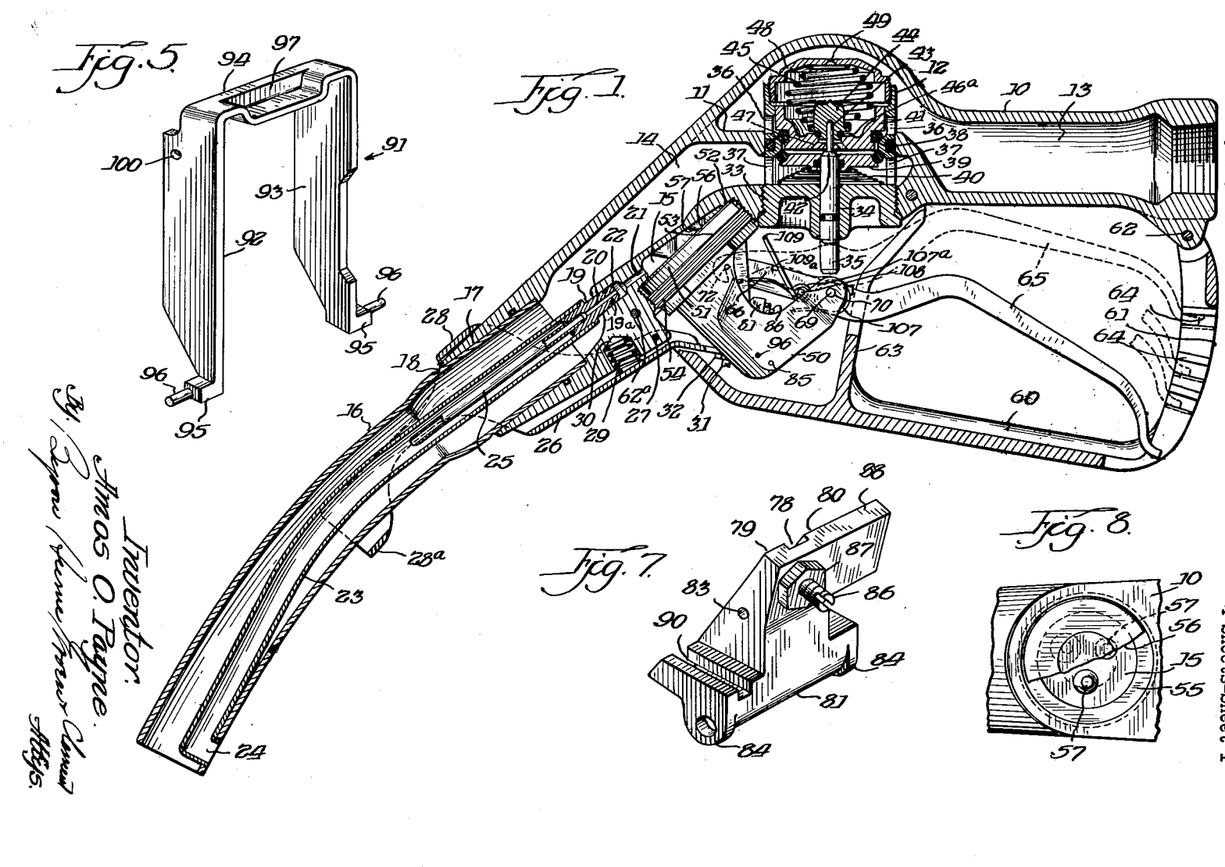
FIGURE 1 is a longitudinal vertical section through an automatic shut-off filling nozzle embodying my invention.
FIGURE 5 is a perspective view of the hammer forming a part of the tripping mechanism.
FIGURE 7 is a perspective view of the lower toggle link forming a part of the tripping mechanism and fulcrum for the manually operated valve opening handle.
FIGURE 8 is a fragmentary view of a portion of the nozzle body showing a plan view of the air receiving chamber therein and a part of the diaphragm partially extending thereover.

A tripping lever 26 is provided which is pivotedly mounted to the nozzle body 10 by means of a pin 27 and has a collar portion 28 thereon which encircles the outer end of the nozzle body 10 and which has an internal diameter larger than the external diameter of the end of the nozzle body 10 so the lever 26 can be moved about its pivot point 27. The collar portion 28 has extensions thereon which extend outward alongside the spout 16 and have a semicircular portion 28a at their outer ends which in one position of the tripping lever 26 engages against the underside of the spout 16. An expansion spring 29 is provided which is seated in a recess 30 in the nozzle body 10 and normally holds the tripping lever 26 in the position shown in FIG. 1 of the drawings, with the collar portion 28 resting against the top of the end of the nozzle body 10. An adjusting screw 31 having a lock nut 32 thereon is provided at the end of the tripping lever 26 opposite the collar portion 28 and performs the function of holding the valve operating mechanism in inoperative position and also trips the valve operating mechanism to inoperative position permitting the valve to close if the nozzle is disturbed during a filling operation as hereinafter described.

The valve 12 has an externally threaded base portion 33 which has a bore 34 therethrough within which a valve operating stem 35 is slidably mounted. The valve 12 has a plurality of inlet openings 36, 36 in its casing wall and a plurality of similar outlet openings 37, 37 therein, the inlet and outlet openings being spaced from each other in a vertical direction, with a two-way valve seat 38 being provided and having a lower valve member 39 normally held in position by a low powered expansion spring 40 seated upon the base portion 33 of the valve casing and which spring 40 normally retains the valve member 39 in closed position against the lower inclined portion of the valve seat 38 with the valve member 39 being slidably mounted upon the stem 35. The stem 35 projects upward and has a shoulder 42 thereon and has a reduced upper end 43 which extends through the main upper valve member or poppet 41 which is slidably mounted upon the reduced upper end 43 of the stem 35 and normally is seated upon the upper inclined portion of the valve seat 38 and is raised by the valve stem 35 by the engagement of the shoulder 42 on the valve stem 35 coming into engagement with the lower side of the valve member 41. A secondary poppet or valve 44 is slidably mounted upon the reduced end 43 of the valve stem 35 which extends into a blind recess in the secondary poppet 44 with an expansion spring 45 being provided which is seated at its lower end upon an annular flange on the secondary poppet 44. The primary valve 41 has an annular recess 46 formed therein within which the lower reduced end of the secondary poppet 44 is seated with a sealing ring 46a being provided which is seated on the primary valve 41 and extends around the reduced end of the secondary poppet 44. Ports 47, 47 extend through the primary valve 41 from the recess 46 to the space between the primary valve 41 and the lower valve 39 for purposes hereinafter described. A cap 48 is provided for the valve 12 which is in threaded engagement with the body of the valve member 12 and which has a vent 49 therein for purposes hereinafter described.

The primary purpose of the valve arrangement is to control the flow of fluid through the nozzle in as efficiently a manner as possible particularly as the fluid is under pressure usually around twenty-five pounds per square inch which means that the valve must be opened against this pressure and closes suddenly with the pressure particularly when the valve opening mechanism is suddenly tripped during the operation of the nozzle which could result in heavy shock to the metering mechanism of the pump and damage thereto unless such shock is minimized. The valve is opened by an upward thrust on the stem 35 which initially raises the secondary poppet 44 through the engagement of the reduced end 43 of the stem 35 against the poppet 44 at the bottom of blind opening in the poppet 44 from its seat around the edge of the recess 46 permitting fluid which is in the valve body 12 which has entered through the port 49, to pass through the ports 47, 47 to the space between the main poppet 41 and the lower valve 39 relieving the pressure on the main poppet 41 which is thereafter engaged by the shoulder 42 on the stem 35 and lifted to open position with some of the fluid in the valve casing being forced out through the port 49 and the ports 47, 47 through the main poppet 41 thereby lessening the force necessary to open the valve.

When the valve operating mechanism hereinafter described is tripped, the spring 45 initially forces the secondary poppet 44 downward, trapping fluid in the recess 46 which is forced out by the pressure of the secondary poppet 44 which seats on the main poppet 41 and forces it into engagement with the valve seat 38. The closing of the valve is a two stage operation with a resulting cushioning effect on the fluid line thereby greatly reducing the shock through this line on the pump mechanism.

A cage 50 is mounted upon the nozzle body 10 adjacent the chamber 15, the cage 50 being somewhat boot-shaped in contour, and comprises a ring portion 51 with a bearing face 52 extending therearound with an annular shoulder 53 thereon which is engaged by an externally threaded ring 54 in engagement with a threaded portion of the valve body 10. An annular bearing surface 55 is provided on the body member 10 around the chamber 15 with a diaphragm 56 being placed against the annular surface 55 and frictionally held in position against the surface 55 by the surface 52 of the ring portion 51 of the cage 50 and which, when the ring 54 is turned up to a tight position, holds the cage 50 in firm position upon the body member 10 and the diaphragm 56 in flexible position across the chamber 15. A series of projections 57, 57 are formed upon the body member 10 which are placed in triangular relation with each other with the diaphragm 56 zeroed in position against the tops of the projections 57, 57, as hereinafter described.

The cage 50 is open along its short curved side and has an opening 58 in its leg portion at the rear and a second opening 59 at the rear side of its foot portion, the cage 50 providing a housing for the tripping means whereby the main valve is automatically closed and also the parts which enable the operator, upon the proper setting of these parts, to manually open the main valve 12. A guard 60 for the nozzle body 10 is provided which has a rear wall 61 secured to the nozzle body by means of a rivet 62 and at its forward end is secured to the body member 10 by means of a pin 62a. A slotted intermediate wall 63 is provided which extends upward from the guard 60 while spaced stepped projections 64, 64 are provided extending laterally from the rear wall 61 upon which the rear end of a valve operating lever 65 can be placed to hold the valve 12 in varying degrees of opened position as may be desired by the operator.

A U-shaped carrier 66 is provided which has struck-out portions 67 and 68 at the ends of its legs thereon which have reduced end portions 69, 69 which extend into openings 70, 70 in the toe portions of the cage 50 and provide a pivotal mounting for the carrier 66. Openings 71 and 71 are provided near the base of the member 66 within which a pin 72 is mounted to form a fulcrum for the inner end of the lever 65 which is bifurcated at 73 and which has a recess 74 extending into the bifurcated forward end of the lever 65 which, in effect, is hooked over the pin 72. An upper toggle link 75 is provided which has openings 76 and 77 in each of its ends with one end of the link 75 extending into the bifurcated portion 73 of the lever 65, with the link 75 extending downward from the pin 72 into a slot 78 between two side sections 79 and 80 of a lower toggle link 81 and is pivotally mounted to the said toggle link by means of a pin 82, which extends through openings 83, 83 in the side sections 79 and 80 of the lower toggle link 81. The lower toggle link 81 has ears 84, 84 thereon with openings therein through which a pin 85 extends which pin also extends into trunnions on the inside of the side walls of the cage 50 near the heel portion thereof and provides a pivotal mounting for the lower toggle link 81 and about which the said toggle link 81 may rotate, the sides of the toggle link 81 bearing against the trunnions on the side walls of the cage 50 which trunnions serve to properly position the lower toggle link with respect to the parts of the tripping mechanism. The back wall of the toggle link 81 has a screw 86 therein upon which a nut 87 is positioned, to lock the screw in set position, the screw 86 providing means whereby the lower end of the upper toggle link 75 is shifted to a point where the center of the pin 82 is in alignment with the centers of the pins 72 and 85, or perhaps slightly beyond such point so the upper and lower toggle members are alined to support the free end of the carrier 66, with the lower toggle member locked against further rotation by a knee action joint formed by the screw 86 engaging the side of the lower toggle link and the anchored end of the said link by the pin 82.

Prior to the counter-rotation of the lower toggle link 81, the trip lever lip 28a has been moved into contact with the spout 16 thereby moving the point of the screw 31 free of the lower toggle link 81 permitting it to rotate slightly counter-clockwise.

An extension 88 is provided from the side wall 80 on the lower toggle link 81 while at the opposite side of the link 81 a transverse channel 90 is provided, the functions which these elements perform being hereinafter described.

A U-shaped hammer 91 is provided having side walls 92, 93, a top wall 94 and having extensions 95, 95 from each of the ends of the side walls 92 and 93 with pins 96, 96 therein which extend into openings in the side walls of the cage 50 and provide pivotal mountings for the hammer 91 with the top wall 94 having a shoulder portion 97 formed thereon for purposes hereinafter described.

Figure 3:
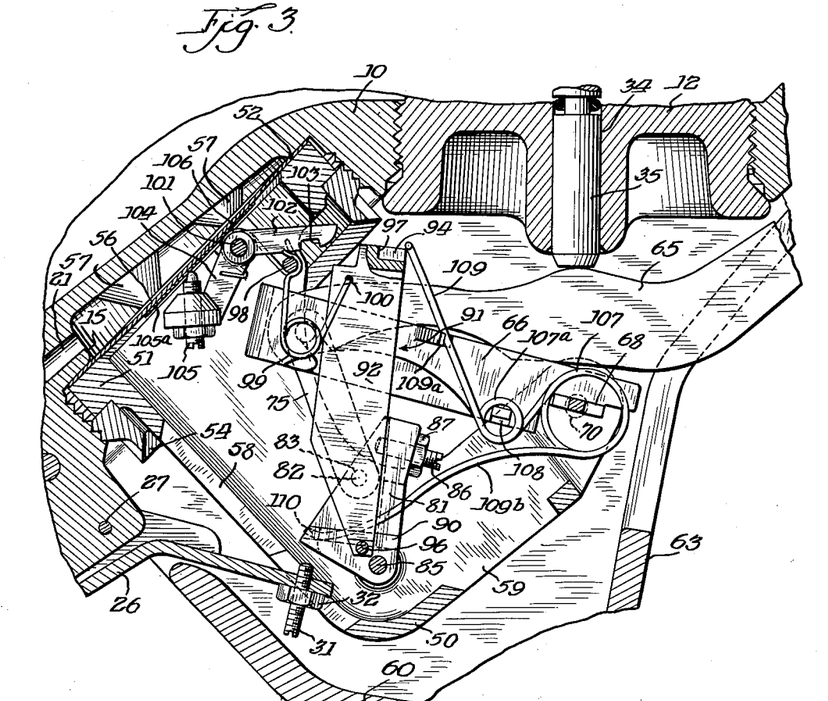
FIGURE 3 is a vertical sectional view of the tripping mechanism immediately after the tripping mechanism has been actuated by the built-up hydrostatic pressure.

A pin 98 is provided which spans the open portion of the cage 50 adjacent the upper end thereof and supports one end of an intermediately coiled torsion spring 99, the other free end of the spring 99 extending into an opening 100 in the side wall 92 of the hammer 91, this spring 99 exerting its force to move the hammer 91 in a clockwise direction of rotation about its pivot point 96. When the hammer 91 is released, the spring 99 rotates in a counter-clockwise direction about the pin 98 to the position shown in FIG. 3 of the drawings where it exerts a strong force on the hammer 91 causing the hammer to strike the arm 88 on the lower toggle member 81 with considerable force causing the toggle member to collapse as hereinafter described. Also mounted in the annular flange 51 of the cage 50 and extending segmentally thereof is a rocker shaft 101 having a latch 102 thereon which has a hook 103 at the end thereof and which is adapted to engage the shoulder 97 on the wall 94 of the hammer 91 and normally holds the hammer in an inoperative position. A second arm 104 extends from the rocker shaft 101 and has a screw 105 mounted therein, the point of which is always in engagement with a thin metal disk 105a sealed to the diaphragm 56 at its center thereof, the center of the disk 105a being opposite the center of the triangular area defined by the projections 57, 57 on the nozzle body 10 within the recess 15, with the screw 105 being adjusted so as to keep the diaphragm pressed against the tops of the said projections 57, 57. A coil spring 106 is wound about the rocker shaft 101 and has one of its free ends anchored under the pin 98 with its other end anchored to the arm 104, and normally exerts its force upon the rocker shaft 101 in a clockwise direction so as to hold the latch 102 in engagement with the hammer 91 and the screw 105 in close engagement with the disk 105a on the diaphragm 56.

Figure 4:
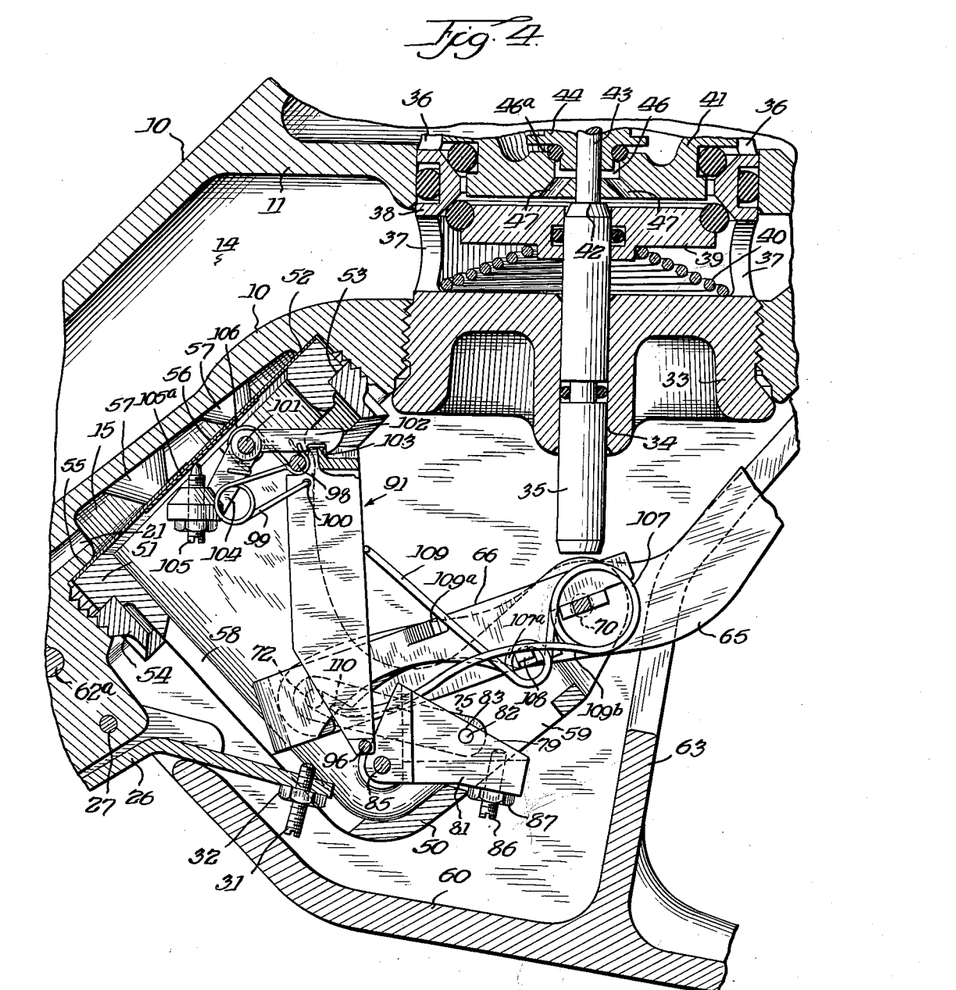
FIGURE 4 is a vertical sectional view of the tripping mechanism showing the various parts in position after the tripping mechanism has functioned and the main valve closed.
Figure 6:
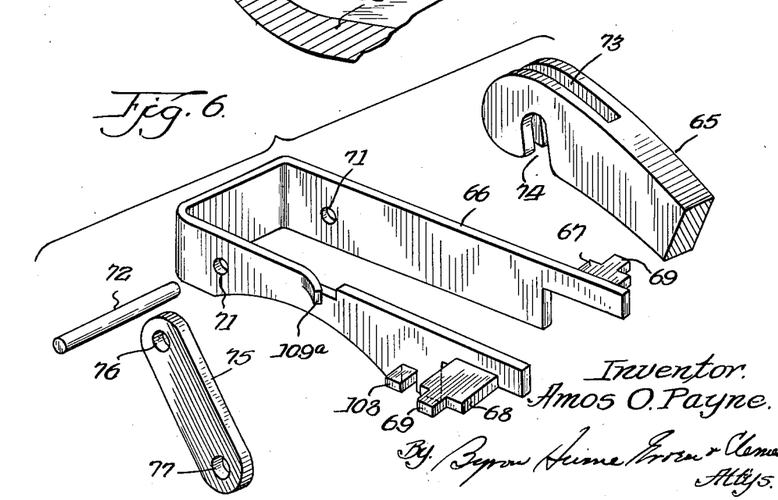
FIGURE 6 is an exploded view showing the U-shaped carrier, the end of the valve operating lever, the upper toggle link and the connecting pin.

Another spring 107 is coiled about the struck-out extension 68 on the carrier 66 and is also coiled at 107a about a struck-out lug 108 on the carrier 66 and terminates in a free portion 109 which rests upon a second struck-out lug 109a on the side of the carrier 66 and with the end of the free portion 109 engaging the hammer 91 when it is tripped and which forces the hammer back to its latched position as shown in FIG. 4, after the device has been tripped. Another portion 109b of this same spring extends downward and terminates in a free end 110 which engages the lower toggle link 81 in the groove 90 and exerts a constant force on the toggle link 81 tending to rotate the toggle link 81 in a counter-clockwise direction about its pivot point 85 thereby keeping the lower toggle link in engagement with the screw 31 on the trip lever in the inoperative position of the toggle member and assists in turning the lower toggle link 81 into an operative position when the screw 31 is moved out of engagement with the lower toggle link 81 and restoring it to an inoperative position after the device has been tripped.

When the operator desires to use the device, he must first "set" or "cock" the device for operation by removing the nozzle from its usual suspended position on the pump and "setting" the tripping mechanism by grasping the spout and pressing the end 28a of the tripping lever 26 into engagement with the spout 16, and inserting the spout into the gas tank opening while holding the end 28a in engagement with the spout 16, or by placing the spout 16 into the gas tank opening in such manner that the spout 16 rests upon the end 28a thereby holding these two elements together. The squeezing of the trip lever 26 against the spout 16 moves the screw 31 free of the lower toggle member 81 permitting a counter-clockwise rotation of the toggle member 81 a slight distance because of the action of the spring 109b thereon until the center of the pin 82 is alined with the centers of the pins 72 and 85, or possibly to a position where the pin 82 is very slightly beyond the center line 111 in which position the lower toggle 81 is locked against further rotation by the screw 86 in engagement with the side of the upper toggle link 75 forming a knee joint between the upper and lower toggle members at this point which prevents further rotation of the lower toggle member 81 in a counter-clockwise direction. The screw 86 is used to adjust the relation of the lower toggle link 81 and the lower end of the upper toggle member 75. When the centers of the toggle members are alined as above-described, the toggle members support the inner free end of the carrier 66 to which the lever 65 is pivoted thereby forming a fulcrum for support of the lever 65.

When the device has been set as above-described, the operator grasps the operating lever 65 and lifts it upward, thereby exerting an end thrust on the stem 35 which force is first transmitted to the secondary poppet 44 through the reduced end 43 of the stem 35, lifting this poppet 44 from its seat on the main poppet or valve member 41, allowing the liquid in the valve casing 12 to escape through the ports 47, 47 thereby somewhat relieving the pressure on the main poppet or valve 41, and with a continued upward thrust on the stem 35, the shoulder 42 on the stem 35 engages the lower face of the valve 41, lifting it from the seat 38 and permitting gasoline to flow through the openings 36, 36 in the valve casing 12 and the valve 39 is forced away from its seat by the pressure of the fluid, allowing free flow of fluid through the valve and out through the discharge spout 16 into a tank. The operator may then hook the free end of the operating lever 65 over one of the projections 64, 64 so as to hold the valve in open position during the filling process against the action of the spring 45 which normally is compressed, but is placed under further compression by the raising of the main valve 41.

Figure 2:
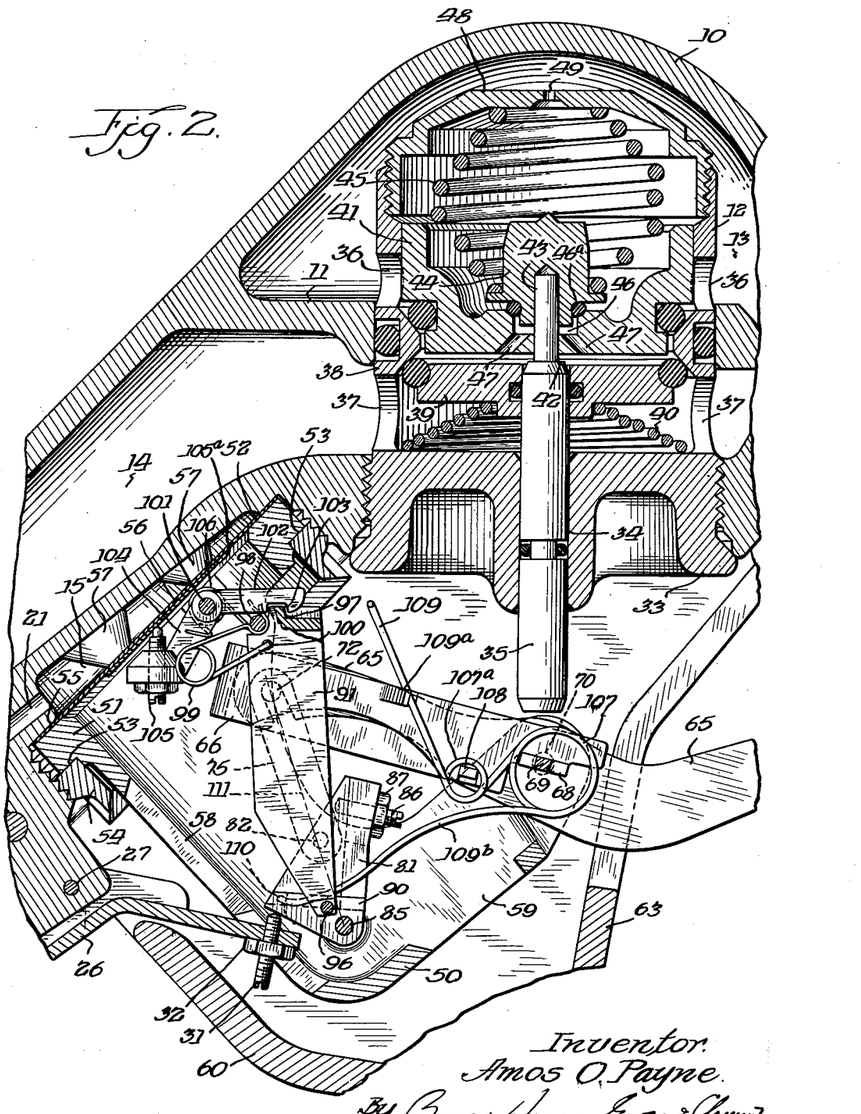
FIGURE 2 is a vertical sectional view showing the device with the valve closed and the tripping mechanism in normal position.

The flow of liquid through the valve continues until the tank is filled whereupon the fluid backs up into the tube 23 through its open end 24, traps air within the tube 23 which flows through the tube 25 and into the chamber 15 and creates a hydrostatic pressure head in the chamber 15 with sufficient pressure to push the diaphgram 56 outward a slight distance and sufficient to move the arm 102 to unlatch it from the hammer 91 thereby releasing the hammer which, under the force of the spring 99, moves in a clockwise direction striking the arm 88 on the lower toggle link 81 with sufficient force to rotate the lower toggle member 81 until the pin 82 is out of alinement with the pins 72 and 85 to the position shown in FIG. 2 of the drawings, in which, under the action of the valve spring 45, exerting a downward thrust on the operating lever 65, causes the carrier to drop downward into a position shown in FIG. 4 of the drawings, thereby permitting the valve 12 to close, shutting off the flow of fluid therethrough. As the free end of the carrier 66 drops downward, the end 109 of the spring 107 engages the hammer 91 and the hammer is forced back to latched position as shown in FIG. 4 of the drawings.

As stem 35 is lowered to stop flow, spring 45 first lowers secondary poppet 44 to its seat 46a thus sealing the area in body 12. At this point spring 45 tends to move both primary and secondary poppets downward as a unit. Because inner poppet is seated this lowering movement builds up a partial vacuum which is relieved only by seepage along the outer walls of primary valve member 41 and flow through port 49. Clearances and size of port 49 are so proportioned that closing speed is adequate yet closing shock is reduced to protect the hose, the metering apparatus or any other part of the pumping system.

As long as the forward end of the lever 65 is fully depressed the end 109 of the spring 107 holds the hammer 91 in its latched position although the latch 102 may be held in out-of-engaged position with the hammer 91 because of pressure in the chamber 15 on the diaphragm 56. The inner end of the lever 65 is held in such depressed position by the valve stem 35 actuated by the valve spring 45 until the outer end of the lever 65 is unlatched from one of the projections 64. In the normal operation of the device, when the device is tripped and the valve closes, the operator removes the nozzle from the tank withdrawing the spout 16 which releases the pressure in the chamber 15, allowing the diaphragm 56 to resume its normal position thereby permitting the latch 102 to engage the hammer 91. After the nozzle is removed the operator releases the outer end of the valve lever 65 thereby permitting the outer end to drop and the spring 107 lifts the inner end of the carrier 66 and inner end of the lever 65 to the position shown in FIG. 2 of the drawings where the toggle members are in slightly out-of-alined position and so held by the screw 31. The valve 41 may not be opened until the outer end of the lever 26 is lifted, after the toggle members have moved to their fully alined positions with the end of the screw 86 in engagement with the side of the link 75 forming a knee joint at this point.

When the outer end of the lever 65 is released the free end of the carrier 66 is raised by the spring 107 in engagement with the lug 108 assisted by the end 109b of the spring 107 exerting its force in a counter clockwise direction upon the lower toggle member 81 to a partially alined position of the toggle members when the lower toggle 81 rotates into engagement with the end of the screw 31 where the parts remain until the lever 26 is moved into engagement with the end 17 of the nozzle.

If, at any time during the operation described above, the spout is removed from the tank or the end of the trip lever 28a becomes misplaced away from the spout 16 by the spout being accidentally removed from the gas tank, the spring 29 forces the tripping lever into a position where the collar portion 28 engages against the end of the nozzle body 10, thereby pivoting the trip lever 26 and forcing the screw 31 against the lower side of the lower toggle member 81, thereby rotating this toggle member in a clockwise direction sufficient to place the centers of the pins 72, 82, and 85 in out-of-alined position as shown in FIG. 2 of the drawings, which causes the toggle members to collapse thereby permitting the valve to close by the action of the spring 45 in the same manner as if the toggle mechanism had been tripped by the action of the diaphragm 56 as hereinabove described. When the device is closed by the action of the tripping member 26, the operator in replacing the nozzle in the tank, forces the end 28a of the tripping lever against the spout thereby moving the screw 31 far enough away from the lower toggle member so that the operator, by releasing the operating lever 65 from one of the projections 64 and dropping the rear end of the lever 65 downward, the toggle members are restored to their alined positions through the action of spring 109b and the main valve may then be reopened and the operation proceeds until the tank is filled and tripped by the diaphragm 56 acting under the force of the hydrostatic pressure in the chamber 15.

It will thus be understood that the shutting off of the flow of liquid through the valve is accomplished either by hydrostatic pressure developed when the tank is full, or by the tripping lever 26 during any intermediate stage of the filling operation so that the flow of gasoline is immediately shut off without spilling around the filling station.

If a purchaser should desire to purchase a measured quantity of gasoline, or the like, the trip lever is moved to a position where the toggle 81 is allowed to rotate counterclockwise thereby restoring the upper and lower toggle links to a position where they remain fixed and the operator, by holding the lever 65, may open the main valve 12 and permit the desired quantity of gasoline to flow therethrough. When this is accomplished, he merely releases the lever 65 which drops downward and when the spout is removed from the tank, the trip lever also moves into a position where the screw 31 engages the lower surface of the lower toggle link 81 and rotates it slightly in a clockwise direction thereby moving the pin 82 out of alinement with the pins 72 and 85 causing the toggle members to collapse and placing the device in an inoperative position. It will be understood therefore that this device can be used either as an automatic closing device when a purchaser desires a tank full of gasoline or may be used for measuring out any desired quantity of gasoline, now in common practice with the dispensing nozzles.

I have shown somewhat diagrammatically one preferred form of my invention but it is to be understood that it may be varied to meet differing conditions and requirements and I therefore contemplate such modifications as come within the spirit and scope of the appended claims.

What is claimed is:

1. An automatic closing nozzle for dispensing liquid comprising a hollow nozzle body having a partition wall therein dividing the hollow body into a receiving chamber and a discharge chamber, the said partition wall having an opening therein, a self-closing valve mounted in said opening for controlling the flow of liquid from the receiving chamber to the discharge chamber in the nozzle body, a movable stem projecting from the said valve to open the said valve, a movable valve operating lever having a contact portion for the said valve stem and having a handle portion, collapsible support means for one end of the said lever comprising a carrier and a pair of toggle members, means whereby the said toggle members are alined in support position, a movable hammer, a releasable latch normally holding the hammer in inoperative relation with the said toggle members, means operative upon release of the said latch to drive the hammer against one of said toggle members causing the toggle to collapse and allowing the toggle supported end of the lever and the contact portion to drop out of engagement with the valve stem thereby permitting the valve to close, and mechanical means engaging the said hammer to restore it to latched position and to restore the said toggle members to alined operative position.

2. An automatic closing nozzle for dispensing liquid comprising a hollow nozzle body having a partition wall therein dividing the hollow body into a receiving chamber and a discharge chamber, the said partition wall having an opening therein, a self-closing valve mounted in said opening for controlling the flow of liquid from the receiving chamber to the discharge chamber in the nozzle body, a movable stem projecting from the said valve to open the said valve, a cage mounted on the nozzle body, a lever pivotally mounted on the said cage having a handle portion, a rotatable toggle member mounted on the said cage, a toggle link pivotally connected to the said lever and to the toggle member, the toggle member and link forming a support for the end of the lever when in alined position and permitting the end of the lever to drop when in collapsed position, a movable hammer pivotally mounted on the said cage, a releasable latch normally holding the hammer in inoperative position, means whereby the said latch is released from the said hammer, spring means to drive the hammer against the toggle member upon its being released thereby permitting the toggle member and link to collapse and allowing the supported end of the lever to collapse and the valve to close, spring means to restore the toggle member and link to their operating positions and to restore the said hammer to its latched position.

3. An automatic closing nozzle for dispensing liquid comprising a hollow nozzle body having a partition wall therein dividing the hollow body into a receiving chamber and a discharge chamber, the said partition wall having an opening therein, a self-closing valve mounted in said opening for controlling the flow of liquid from the receiving chamber to the discharge chamber in the nozzle body, a movable stem projecting from said valve to open the said valve, a cage mounted on the nozzle body, a lever pivotally mounted on the said cage having a handle portion, a rotatable toggle member mounted on the said cage, a toggle link pivotally connected to the said lever and to the toggle member, the toggle member and link forming a support for the end of the lever when in alined position and permitting the end of the lever to drop when in collapsed position, a movable hammer pivotally mounted on the said cage, a releasable latch normally holding the hammer in inoperative position, means whereby the said latch is released from the said hammer, spring means to drive the hammer against the toggle member upon its being released thereby permitting the toggle member and link to collapse and allowing one supported end of the lever to collapse and the valve to close, spring means to restore the toggle member and link to their operating positions and tripping means normally holding the toggle members in inoperative relation but releasable to permit said toggle members to be aligned to operative position.

4. An automatic closing nozzle for dispensing liquid comprising a hollow nozzle body having a partition wall therein dividing the hollow body into a receiving chamber and a discharge chamber, the said partition wall having an opening therein, a self-closing valve mounted in said opening for controlling the flow of liquid from the receiving chamber to the discharge chamber in the nozzle body, a movable stem projecting from the said valve to open the said valve, a cage mounted on the nozzle body, a lever pivotally mounted on the said cage having a handle portion, a rotatable toggle member mounted on the said cage, a toggle link pivotally connected to the said lever and to the toggle member, the toggle member and link forming a support for the end of the lever when in alined position and permitting one end of the lever to drop when in collapsed position, a movable hammer pivotally mounted on the said cage, a releasable latch normally holding the hammer in inoperative position, means whereby the said latch is released from the said hammer, spring means to drive the hammer against the toggle member upon its being released thereby permitting the toggle member and link to collapse and allowing one supported end of the lever to drop and the valve to close, spring means to restore the toggle member and link to their operating positions and a pivotally mounted tripping lever, one end in engagement with the toggle member whereby the said toggle member is held in inoperative position but movable to permit said toggle member to rotate to operative positive.

5. An automatic closing nozzle for dispensing liquid comprising a hollow nozzle body having a partition wall therein dividing the hollow body into a receiving chamber and a discharge chamber, the said partition wall having an opening therein, a self-closing valve mounted in said opening for controlling the flow of liquid from the receiving chamber to the discharge chamber in the nozzle body, a discharge spout on the said nozzle body, a movable stem projecting from the said valve to open the said valve, a cage mounted on the nozzle body, a lever pivotally mounted on the said cage having a handle portion, a rotatable toggle member mounted on the said cage, a toggle link pivotally connected to the said lever and to the toggle member, the toggle member and link forming a support for the end of the lever when in alined position and permitting the end of the lever to drop when in collapsed position, a movable hammer pivotally mounted on the said cage, a releasable latch normally holding the hammer in inoperative position, means whereby the said latch is released from the said hammer, spring means to drive the hammer against the toggle member upon its being released thereby permitting the toggle member and link to collapse and allowing one supported end of the lever to collapse and the valve to close, spring means to restore the toggle member and link to their operating positions and a pivotally mounted lever on the said nozzle body one end of said lever being in engagement with the said nozzle and the other end engaging the said toggle member whereby its rotation is limited.

6. An automatic closing nozzle for dispensing liquid comprising a hollow nozzle body having a partition wall therein dividing the hollow body into a receiving chamber and a discharge chamber, the said partition wall having an opening therein, a self-closing valve mounted in said opening for controlling the flow of liquid from the receiving chamber to the discharge chamber in the nozzle body, a discharge spout on the said nozzle body, a movable stem projecting from the said valve to open the said valve, a cage mounted on the nozzle body, a lever pivotally mounted on the said cage having a handle portion, a rotatable toggle member mounted on the said cage, a toggle link pivotally connected to the said lever and to the toggle member, the toggle member and link forming a support for the pivoted end of the lever when in alined position and permitting the pivoted end of the lever to drop when in collapsed position, a movable hammer pivotally mounted on the said cage, a releasable latch normally holding the hammer in inoperative position, means whereby the said latch is released from the said hammer, spring means to drive the hammer against the toggle member upon its being released thereby permitting the toggle member and link to collapse and allowing the supported end of the lever to collapse and the valve to close, spring means to restore the toggle member and link to their operating positions and a pivotally mounted lever on the said nozzle body, one end of said lever having a ring shaped portion extending circumferentially of the said spout and being larger than the said spout and the opposite end of the said lever normally in engagement with the said toggle member to retain the said toggle member in inoperative position.

7. An automatic closing nozzle for dispensing liquid comprising a hollow nozzle body having a partition wall therein dividing the hollow body into a receiving chamber and a discharge chamber, the said partition wall having an opening therein, a self-closing valve mounted in said opening for controlling the flow of liquid from the receiving chamber to the discharge chamber in the nozzle body, a discharge spout on the said nozzle body, a movable stem projecting from the said valve to open the said valve, a cage mounted on the nozzle body, a lever pivotally mounted on the said cage having a handle portion, a rotatable toggle member mounted on the said cage, a toggle link pivotally connected to the said lever and to the toggle member, the toggle member and link forming a support for the end of the lever when in alined position and permitting the end of the lever to drop when in collapsed position, a movable hammer pivotally mounted on the said cage, a releasable latch normally holding the hammer in inoperative position, means whereby the said latch is released from the said hammer, spring means to drive the hammer against the toggle member upon its being released thereby permitting the toggle member and link to collapse and allowing the supported end of the lever to collapse and the valve to close, spring means to restore the toggle member and link to their operating positions and a pivotally mounted lever on the said nozzle body, one end of said lever having a ring shaped portion extending circumferentially of the said spout and being larger than the said spout, and an adjustable member on the opposite end of the said lever for engagement with the said toggle member whereby the toggle member is held in out-of-alined position with the toggle link in one position of the tripping lever and moved to out-of-alined position with the toggle link in another position of the tripping lever.

8. An automatic closing nozzle comprising in combination a nozzle body having a partition wall therein dividing the nozzle body into a receiving chamber and a discharge chamber, the partition wall having an opening therein, a spring actuated valve mounted in the opening in the partition wall, a valve operating stem projecting from the said valve, the nozzle body having an air receiving recess formed therein, a discharge spout on the said nozzle body communicating with the discharge chamber in the nozzle body, a tube in the said spout secured to the nozzle body at one of its ends and secured at its opposite end to the said nozzle adjacent its discharge end and in communication with the air receiving recess in the nozzle body, a cage open at one of its ends secured to the nozzle body, a diaphragm across the said open end of the cage spanning the air receiving recess, a carrier mounted on the cage at one of its ends with its opposite end being freely movable, a valve operating lever pivotally mounted in the movable end of the said carrier, a toggle member rotatably mounted on the said cage, a toggle link pivotally mounted upon the toggle member at one of its ends and movably connected to the carrier at its opposite end and means whereby the toggle member is rotated whereby the mounting of the toggle link with the toggle member is moved to an alined position with the mounting of the toggle member and the mounting of the toggle link in the carrier and locking means on the toggle member to lock the said link in such alined position.

9. An automatic closing dispensing nozzle comprising in combination a nozzle body having a wall therein separating the said nozzle into a receiving chamber and a discharge chamber and having an air pressure recess therein, a spring actuated valve between the said chambers, a valve stem projecting outward of said valve, a cage attached to the said nozzle body, a lever carrier pivotally mounted on the said cage, a valve operating lever pivotally mounted on the said carrier, a toggle member pivotally mounted on the said cage, a toggle link pivotally connected to the said carrier and to the said toggle member, means whereby the toggle member is held against rotation in one direction, a discharge spout on the said nozzle pivotally mounted on the said cage, a torsion spring secured to the cage at one of its ends and to the hammer at its other end, a rocker member on the said cage, a latch member for the said hammer on the rocker member, a second arm on the rocker member terminating adjacent the said diaphragm, a carrier pivotally mounted at one of its ends on the cage, a valve operating lever pivotally connected to the free end of the said cage and adapted to engage the said valve stem, a toggle member pivotally mounted on the said cage, a toggle link pivotally connected to the free end of the carrier at one of its ends and to the toggle member at its opposite end, and means whereby the toggle member and toggle link are placed in alined relationship to support the free end of the carrier, the said hammer upon being released striking the toggle member whereby the toggle member and toggle link are forced into out-of-line relationship causing the toggle support to collapse and the valve to close.

10. An automatic closing nozzle for dispensing liquid comprising a hollow nozzle body having a partition wall therein dividing the hollow body into a receiving chamber and a discharge chamber, the said partition wall having an opening therein, a self-closing valve mounted in the said opening for controlling the flow of liquid from the receiving chamber to the discharge chamber, a valve operating stem projecting outward from the said valve, the nozzle body having an air receiving recess therein, a hollow cage mounted in the nozzle body adjacent the said recess, a flexible diaphragm extending across one end of the said cage and across the said recess, a carrier pivotally mounted on the said cage, a valve operating lever pivotally mounted upon the said carrier for engagement with the end of the said valve stem, a toggle member rotatably mounted on the said cage, a toggle link connected at one of its ends to the said carrier and the said operating lever and to the said toggle member at its opposite end, a movable hammer on the said cage, a releasable latch normally holding the hammer in restrained position but upon being released permits said hammer to strike the said toggle member, the latch being released by movement of the said diaphragm against the said latch, tripping means under control of the operator for holding the toggle member and toggle link in either out of alined position or in alined position with the toggle link thereby providing a support for the carrier and the operating lever and spring means in engagement with the said hammer and the said toggle member whereby the toggle member is returned to alined position after its collapse and the hammer to latched position.

11. An automatic closing nozzle for dispensing liquid under pressure comprising a hollow nozzle body having a partition wall therein dividing the hollow body into a receiving chamber and a discharge chamber, the said partition wall having an opening therein, a self-closing valve mounted in the said opening for controlling the flow of liquid from the receiving chamber to the discharge chamber, a valve operating stem projecting outward from the said valve, the nozzle body having an air receiving recess therein, a hollow cage mounted in the nozzle body adjacent the said recess, a flexible diaphragm extending across one end of the said cage and across the said recess, a movable carrier pivotally mounted on the said cage, a valve operating lever pivotally mounted upon the said carrier for engagement with the end of the said valve stem, a toggle member rotatably mounted on the said cage, a toggle link connected at one of its ends to the said carrier and the said operating lever and to the said toggle member at its opposite end, a movable hammer on the said cage, a releasable latch normally holding the hammer in restrained position but upon being released permits the said hammer to strike the said toggle member, the latch being released by movement of the said diaphragm against the said latch, tripping means under control of the operator for holding the toggle member and toggle link in either out of alined position or in alined position with the toggle link thereby providing a support for the carrier and the operating lever and a spring coiled about the pivotal connection of the said carrier having one free end adapted to engage the hammer and return to latched position after being released and having another free end in engagement with the toggle member to rotate the said toggle member into alined relation with the said toggle link.

12. An automatic closing nozzle for dispensing liquid comprising a hollow nozzle body having a partition wall therein dividing the hollow body into a receiving chamber and a discharge chamber, the said partition wall having an opening therein, a self-closing valve mounted in the said opening for controlling the flow of liquid from the receiving chamber to the discharge chamber, a valve operating stem projecting outward from the said valve, the nozzle body having an air receiving recess therein, a discharge spout on the said nozzle body, a hollow cage mounted in the nozzle body adjacent the said recess, a flexible diaphragm extending across one end of the said cage and across the said recess, a movable carrier pivotally mounted on the said cage, a valve operating lever pivotally mounted upon the said carrier for engagement with the end of the said valve stem, a toggle member rotatably mounted on the said cage, a toggle link connected at one of its ends to the said carrier and the said operating lever and to the said toggle member at its opposite end, a movable hammer on the said cage, a releasable latch normally holding the hammer in restrained position but upon being released, strikes the said toggle member, the latch being released by movement of the said diaphragm against the said latch, tripping means under control of the operator for holding the toggle member and toggle link in either out-of-alined position or in alined position with the toggle link thereby providing a support for the carrier and the operating lever, a tube carried by the said nozzle body extending longitudinally of the said spout and communicating with the said recess whereby air trapped in the said tube is compressed into the recess by the discharged fluid backing up into the said tube.

13. An automatic closing nozzle for dispensing liquid comprising a hollow nozzle body having a partition wall therein dividing the hollow body into a receiving chamber and a discharge chamber, the said partition wall having an opening for controlling the flow of liquid from the receiving chamber to the discharge chamber, a valve operating stem projecting outward from the said valve, the nozzle body having an air receiving recess therein, a discharge spout on the said nozzle body, a hollow cage mounted in the nozzle body adjacent the said recess, a flexible diaphragm extending across one end of the said cage and across the said recess, a movable carrier pivotally mounted on the said cage, a valve operating lever pivotally mounted upon the said carrier for engagement with the end of the said valve stem, a toggle member rotatably mounted on the said cage, a toggle link connected at one of its ends to the said carrier and the said operating lever and to the said toggle member at its opposite end, a movable hammer on the said cage, a releasable latch normally holding the hammer in restrained position, a longitudinally mounted spring on the said hammer whereby the said hammer upon being released is driven against one of the toggle members, the latch being released by movement of the said diaphragm against the said latch, tripping means under control of the operator for holding the toggle member and toggle link in either out-of-alined position or in alined position with the toggle link thereby providing a support for the carrier and the operating valve lever, a tube carried by the said nozzle body extending longitudinally of the said spout and a second small tube extending into the tube in the said spout and spaced from the walls thereof and having a passage therethrough in communication with the air receiving recess in the nozzle body whereby air may pass into the said recess but fluid collecting in the tube in the nozzle body is excluded therefrom.

14. Control apparatus for dispensing nozzles having self-closing valves therein and having a compartment therein in which air is received and compressed therein, an open ended cage mounted on the nozzle body adjacent the air receiving compartment, a diaphragm closing the open end of the said cage and spanning the said air receiving compartment, a U-shaped carrier mounted on the said cage at the ends of its leg portions, and free at its opposite end, a valve operating lever pivotally mounted upon the free end of the carrier having a contact portion for a valve stem and having a handle portion, a rotatable mounted toggle member on the said cage, a toggle link connected to the toggle member at one of its ends and with the free end of the carrier at its opposite end, a movable stop supporting the toggle member against rotation in one direction in either off center position upon either side of the center line of its pivotal mounting on the cage and the center line of the mounting of the toggle link on the toggle member, a spring loaded hammer on the said cage, a releasable latch normally holding the hammer in restrained position, but upon release permitting the hammer to strike the toggle member thereby rotating the toggle member away from the support member and into out-of-line position with the toggle link whereby the toggle support is collapsed and the valve permitted to close.

15. Control apparatus for dispensing nozzles having self-closing valves therein and having a compartment therein whereby air is returned and compressed by the backup of liquid discharged therefrom, an open ended cage mounted on the nozzle body adjacent the air receiving compartment, a diaphragm closing the open end of the said cage and spanning the said air receiving compartment, a carrier mounted on the said cage at the ends of its leg portions, and free at its opposite end, a valve operating lever pivotally mounted upon the free end of the carrier having a contact portion for a valve stem and having a handle portion, a rotatable mounted toggle member on the said cage, a toggle link connected to the toggle member at one of its ends and with the free end of the carrier at its opposite end, a movable stop for holding the toggle members in alined positions, a spring loaded hammer on the said cage, a releasable latch normally holding the hammer in restrained position, but upon release, permits the hammer to strike the toggle member whereby the toggle support is collapsed and the valve is permitted to close.

16. Control apparatus for dispensing nozzles having self-closing valves therein and having a compartment therein whereby air is received and compressed by the backup of liquid discharged therefrom, an open ended cage mounted on the nozzle body adjacent the air receiving compartment, a diaphragm closing the open end of the said cage and spanning the said air receiving compartment, a carrier mounted on the said cage at the ends of its leg portions, and free at its opposite end, a valve operating lever pivotally mounted upon the free end of the carrier having a contact portion for a valve stem and having a handle portion, a rotatable mounted toggle member on the said cage, a toggle link connected to the toggle member at one of its ends and with the free end of the carrier at its opposite end, an adjustable stop in the toggle member engaging the toggle link permitting the rotation of the toggle link in one direction and stopping its rotation in the opposite direction, a spring loaded hammer on the said cage, a releasable latch normally holding the hammer in restrained position, but upon release permitting the hammer to strike the toggle member thereby rotating the toggle member away from the support member and into out-of-line position with the toggle link whereby the toggle support is collapsed and the valve permitted to close.

17. Control apparatus for dispensing nozzles having self-closing valves therein and having a compartment therein whereby air is received and compressed by the backup of liquid discharge therefrom, an open ended cage mounted on the nozzle body adjacent the air receiving compartment, a diaphragm closing the open end of the said cage and spanning the said air receiving compartment, a carrier mounted on the said cage at the ends of its leg portions, and free at its opposite end, a valve operating lever pivotally mounted upon the free end of the carrier having a contact portion for a valve stem and having a handle portion, a rotatable mounted toggle member on the said cage, a toggle link connected to the toggle member at one of its ends and with the free end of the carrier at its opposite end, a movable trip lever normally holding the toggle member in out-of-line position with the toggle link, a stop on the said toggle member in engagement with the toggle link limiting the rotation movement of the toggle member and locking the toggle member and toggle link in support position for the said carrier, a spring loaded hammer on the said cage, a releasable latch normally holding the hammer in restrained position, but upon release permitting the hammer to strike the toggle member thereby rotating the toggle member away from the toggle link and into out-of-line position with the toggle link whereby the toggle support is collapsed and the valve is permitted to close.

18. A dispensing nozzle for liquids comprising a nozzle body having a fluid receiving chamber therein and a fluid discharge chamber and a discharge spout thereon, and having a dividing wall with an opening therein separating the receiving and discharge chambers and having an air receiving recess therein, a self-closing valve in the opening in the dividing wall, a valve stem extending outward from the said valve, a cage on the said nozzle body, a flexible diaphragm on the said cage extending across the said recess whereby a closed air receiving chamber is formed, a carrier pivotally mounted at one of its ends on the said cage, a valve operating handle pivotally mounted on the said carrier, a toggle member pivotally mounted on the said cage, a second toggle member pivotally connected to the said carrier and to the first mentioned toggle member, a spring connected with one of said toggle members whereby the toggle members are forced into support position for the carrier and a plurality of tripping means for the toggle members operating independently of each other either by the rise of fluid in the tank being filled or by the displacement of the filling nozzle during the filling operation.

19. A dispensing nozzle for liquids comprising a nozzle body having a fluid receiving chamber therein and a fluid discharge chamber and a discharge spout thereon, and having a dividing wall with an opening therein separating the receiving and discharge chambers and having an air receiving recess therein, a self-closing valve in the opening in the dividing wall, a valve stem extending outward from the said valve, a cage on the said nozzle, a flexible diaphragm on the said cage extending across the said recess whereby a closed air receiving chamber is formed, a carrier pivotally mounted at one of its ends on the said cage, a valve operating handle pivotally mounted on the said cage, toggle support means comprising a pair of toggle members pivoted together, one of said toggle members being pivotally connected to the carrier and the other toggle member pivotally connected to the cage and a plurality of tripping means for the toggle support means operating independently of each other either by the rise of fluid in the tank being filled or by the displacement of the filling nozzle during the filling operation.

20. A dispensing nozzle for liquids comprising a nozzle body having a fluid receiving chamber therein and a fluid discharge chamber and a discharge spout thereon, and having a dividing wall with an opening therein separating the receiving and discharge chambers and having an air receiving recess therein, a self-closing valve in the opening in the dividing wall, a valve stem extending outward from the said valve, a cage on the said nozzle, a flexible diaphragm on the said cage extending across the said recess whereby a closed air receiving chamber is formed, a carrier pivotally mounted at one of its ends on the said cage, a valve operating handle pivotally mounted on the said cage, toggle members pivotally connected to each other and to the said cage and support member, the toggle members when in aligned relation with each other forming a support for the said carrier and a plurality of tripping means for the toggle members operating independently of each other either by the rise of fluid in the tank being filled or by the displacement of the filling nozzle during the filling operation.

21. An automatic liquid dispensing nozzle comprising a body portion and a spout connected thereto, a diaphragm chamber in said body portion, an air pressure control conduit within said spout having its inner end communicating with said diaphragm chamber and its outer end secured to the outlet end of the spout, a weakening groove portion at the upper periphery of the spout located near the connection of said spout to the body portion, a peripheral portion on the lower periphery of said spout stronger than, and circumferentially aligned with, said weakening groove portion, and means releasably connecting said air pressure control conduit to said body portion release and separation occurring upon the breakage of said spout at said weakening groove and its separation from said body portion.

References Cited in the file of this patent

UNITED STATES PATENTS

| | | |
|---|---|---|
| 1,725,826 | Payne | Aug. 27, 1929 |
| 1,903,139 | Trompeter | Mar. 28, 1933 |
| 2,080,485 | Johnsen | May 18, 1937 |
| 2,303,179 | Sitton et al. | Nov. 24, 1942 |
| 2,420,341 | Samiran et al. | May 13, 1947 |
| 2,528,697 | Logan et al. | Nov. 7, 1950 |
| 2,638,924 | St. Clair | May 19, 1953 |
| 2,758,768 | Payne | Aug. 14, 1956 |
| 2,811,180 | Zaugg et al. | Oct. 29, 1957 |
| 2,841,191 | Frazer | July 1, 1958 |